Dec. 29, 1931.  C. A. TEA  1,838,644
SHOCK ABSORBER
Filed June 25, 1928
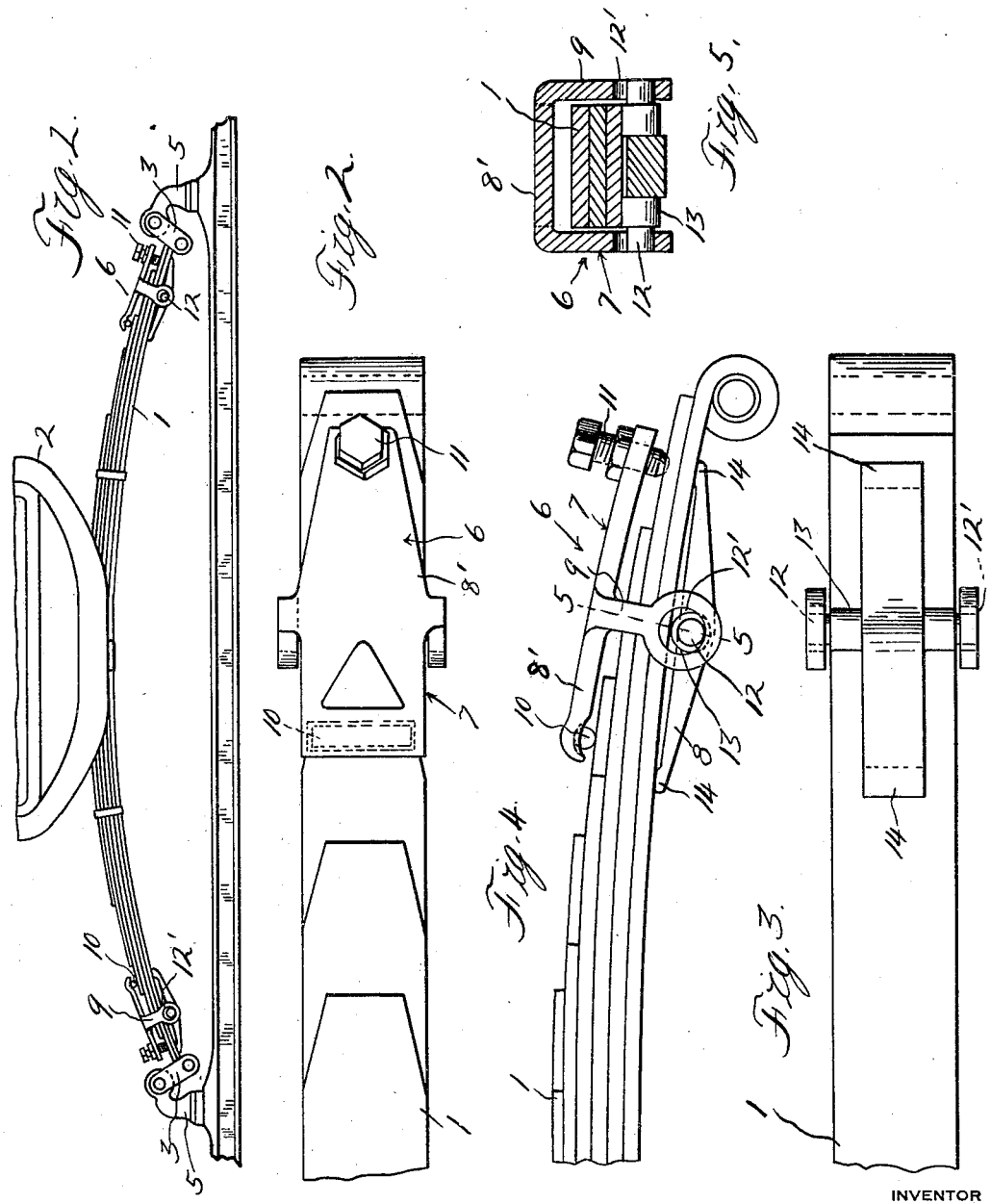
INVENTOR
Clark A. Tea
BY
ATTORNEYS Patented Dec. 29, 1931

1,838,644

UNITED STATES PATENT OFFICE

CLARK A. TEA, OF DETROIT, MICHIGAN, ASSIGNOR TO DETROIT STEEL PRODUCTS COMPANY, OF DETROIT, MICHIGAN, A CORPORATION OF MICHIGAN

SHOCK ABSORBER

Application filed June 25, 1928. Serial No. 288,247.

The invention relates to shock absorbers for vehicle leaf springs and has for one of its objects to so construct the shock absorbing device that it does not appreciably interfere with the riding properties of the spring over fairly smooth pavements or roads. Another object is to so construct the shock absorbing device that it is applicable to a leaf spring to increase its resistance to deflection in either direction. A further object is to provide a shock absorbing device which may be readily applied to a leaf spring and secured in place. With these as well as other objects in view, the invention resides in the novel features of construction and combinations and arrangements of parts as more fully hereinafter set forth.

In the drawings:—

Figure 1 is a front elevation of a vehicle spring equipped with a shock absorber embodying the invention;

Figures 2, 3 and 4 are, respectively, top, bottom and front views of a portion thereof;

Figure 5 is a cross section on the line 5—5 of Figure 4.

The vehicle leaf spring 1, shown in the present instance, is connected at its middle to the vehicle frame 2 and at each of its ends to the shackle 3, which through the post 4 is connected to the axle 5. A shock absorbing device 6 embodying our invention is preferably applied to each of the end portions of the spring. This shock absorbing device comprises the frame 7 and the bridge 8, each of which is provided with contact bearings for engaging the opposite sides of the spring. The frame 7 is preferably formed of sheet metal and is T-shaped, it having the plate 8' forming the head of the T and the arms 9 extending transversely from opposite edges of the plate intermediate its ends and forming the stem of the T. 10 is a roll at one end of the plate and 11 is a set screw at the other end of the plate forming contact bearings for engaging different leaves of the spring on its convex side. The bridge 8 is rigid and preferably a forging and it is pivotally connected to the frame 7 by means of the gudgeons 12 engaging in the transverse openings 12' formed in the enlarged ends of the arms 9. The bridge has the transversely extending boss 13 intermediate its ends and opposite to or in alignment with the arms 9 and also the transversely extending bosses 14 at its ends, these three bosses forming contact bearings for engaging the lower side of the main leaf of the spring at its concave side. The distance between the contact bearings 14 is greater than that between the contact bearings 10 and 11 and, as shown in the present instance, the contact bearing 14 nearest the end of the spring 1 is opposite to or in alignment with the contact bearing 11, while the other contact bearing 14 is located longitudinally inwardly of the spring beyond the contact bearing 10.

This shock absorber forms a unit upon the spring and may be readily applied thereto, there being sufficient clearance between the arms 9 to provide for first inserting one gudgeon 12 of the bridge 8 into an opening in one of the arms beyond the position it finally assumes and then inserting the other gudgeon into the other arm, after which the bridge may be moved transversely of the spring to its proper position. The set screw 11 may then be tightened, the arrangement being such that while tightening the set screw the contact bearings 14 of the bridge are brought into contact with the spring 1 before the contact bearing 13 is forced into contact therewith by the yielding of the spring.

In operation when the spring is subjected to increased pressure or weight caused, for example, by a wheel of the vehicle hitting some obstruction, the spring leaves between the contact bearings 10 and 11 and the contact bearing 13 are forced together with an increased pressure upon flexing of the spring, thereby increasing the frictional resistance to movement of these leaves longitudinally relative to each other and absorbing the shock. Upon recoil of the spring the contact bearings 14 come into play, these contact bearings cooperating with the contact bearings 10 and 11 to force the spring leaves therebetween into frictional engagement with an increasing pressure. As a result, it will be seen that each shock absorbing device functions to increase the resistance to deflection of the spring in both directions. The plate 8 of the frame of the shock absorber being resilient to move with the spring 1, but to a less extent, the increasing of the pressure between the spring leaves upon slight flexing of the spring when the vehicle is moving over fairly smooth pavements or roads is very slight, so that the riding properties of the spring are not appreciably affected.

What I claim as my invention is:

1. The combination of a vehicle frame, an axle, a leaf spring supporting the frame upon the axle and a shock absorber for the spring operating independently of the frame and axle to force a plurality of the leaves of the spring together with an increasing pressure upon flexure of the spring, said shock absorber having a resilient frame adapted to flex with but to a less extent than the spring, a pair of contact bearings upon said last mentioned frame engaging one side of the spring at longitudinally spaced points and a single contact bearing connected to said last mentioned frame and engaging the opposite side of the spring at a point longitudinally intermediate the points of contact of the first mentioned contact bearings, one of the contact bearings being adjustable to place the spring leaves between the contact bearings under a predetermined pressure when the spring is in normal position.

2. The combination of a vehicle leaf spring and a shock absorber for the spring having a T-shaped frame, contact bearings upon the head of said frame engaging one side of the spring at longitudinally spaced points, a bridge connected to the stem of said frame and contact bearings upon said bridge engaging the opposite side of the spring at longitudinally spaced points, one of the last mentioned contact bearings being located intermediate the first mentioned contact bearings and the other of the last mentioned contact bearings being separated a distance different than that between said first mentioned contact bearings.

3. The combination of a vehicle leaf spring and a shock absorber for the spring having a T-shaped frame with a plate forming the head and a stem, contact bearings at the ends of said plate engaging the convex side of the spring, a bridge pivotally connected to said stem and contact bearings upon said bridge and engaging the concave side of the spring, one of said last mentioned bearings being opposite said stem and the other of said last mentioned contact bearings being spaced apart a distance greater than that between said first mentioned contact bearings.

4. The combination of a vehicle leaf spring and a shock absorber for the spring having a sheet metal frame provided with a plate and arms extending transversely from opposite edges of said plate intermediate its ends, contact bearings upon said plate engaging one side of the spring at longitudinally spaced points, a bridge pivotally connected to said arms and contact bearings upon said bridge and engaging the opposite sides of the spring at longitudinally spaced points.

5. The combination of a vehicle leaf spring and a shock absorber for the spring having a sheet metal frame provided with a plate and arms extending transversely from opposite edges of said plate intermediate its ends, contact bearings upon said plate engaging the convex side of the spring at longitudinally spaced points, a rigid bridge pivotally connected to said arms and contact bearings at the opposite ends of said bridge and at an intermediate point engaging the concave side of the spring at longitudinally spaced points, the distance between the contact bearings at the ends of said bridge being greater than that between the first mentioned contact bearings and one of the first-mentioned contact bearings being adjustable to place the spring leaves between the contact bearings under a predetermined pressure when the spring is in normal position.

6. The combination of a vehicle leaf spring and a shock absorber having a T-shaped frame with contact bearings at the ends of the head of said frame engaging one side of the spring and a contact bearing upon the stem of said frame engaging the opposite side of the spring at a point longitudinally intermediate the points of contact of the first-mentioned contact bearings.

7. The combination of a vehicle leaf spring and a shock absorber having a T-shaped frame with a resilient plate forming the head and a stem, contact bearings at the ends of said plate engaging one side of the spring and a contact bearing upon said stem engaging the opposite side of the spring at a point longitudinally intermediate the points of contact of the first mentioned contact bearings, one of said contact bearings being adjustable to place the spring leaves between the contact bearings under a predetermined pressure when the spring is in normal position.

8. The combination of a vehicle leaf spring and a shock absorber having a T-shaped frame with contact bearings upon the frame engaging one side of the spring at longitudinally spaced points, a rigid member pivotally connected to the stem of said frame and having spaced contact bearings engaging the opposite side of the spring at longitudinally spaced points, one of the contact bearings on the frame positioned in alignment with the opposite contact bearing on the member aforesaid.

9. The combination of a vehicle leaf spring and a shock absorber having a frame, a contact bearing on said frame engageable with one side of the spring, means carried by said frame including a member having spaced contact bearings engageable with the opposite side of the spring at longitudinally spaced points and having another contact bearing engageable with the last mentioned side of the spring at a point intermediate the spaced contact bearings aforesaid.

10. The combination of a vehicle leaf spring and a shock absorber having a frame provided with lateral projections extending upon opposite sides of the spring, contact bearings upon the frame engaging another side of the spring at longitudinally spaced points, means for adjusting one of said contact bearings, a member disposed upon the side of the spring opposite the last-mentioned side between said projections and pivotally connected intermediate the ends thereof to said projections, said member having contact bearings engaging the adjacent side of the spring at longitudinally spaced points, one of said contact bearings positioned directly opposite the adjustable contact bearing aforesaid.

In testimony whereof I affix my signature.

CLARK A. TEA.